United States Patent [19]
Oshima et al.

[11] Patent Number: 5,130,617
[45] Date of Patent: Jul. 14, 1992

[54] INVERTER CONTROL DEVICE FOR DRIVING AN ELEVATOR

[75] Inventors: Kenji Oshima, Yokohama; Yasutami Kito, Kasugai, both of Japan

[73] Assignee: Otis Elevator Company, Farmington, Conn.

[21] Appl. No.: 636,858

[22] Filed: Jan. 2, 1991

[30] Foreign Application Priority Data

Jul. 3, 1989 [JP] Japan .................................. 1-171570

[51] Int. Cl.$^5$ .............................................. H02P 3/18
[52] U.S. Cl. ...................... 318/34; 318/811; 318/255; 363/71
[58] Field of Search ................ 318/803–805, 318/811, 798, 806, 807, 809, 696, 138, 254; 363/43, 37, 71

[56] References Cited

U.S. PATENT DOCUMENTS

| | | | |
|---|---|---|---|
| 4,085,355 | 4/1978 | Fradella | 318/168 |
| 4,640,389 | 2/1987 | Kamaike | 318/807 |
| 4,783,728 | 11/1988 | Hoffman | 363/37 |
| 5,017,855 | 5/1991 | Byers et al. | 318/811 |

Primary Examiner—William M. Shoop, Jr.
Assistant Examiner—John W. Cabeca

[57] ABSTRACT

An inverter control device for controlling an induction motor that drives elevators, has two induction motor coils that are electrically separate with inverters connected to each coil, and a control device that controls these two inverters with the same current command. The preferred structure is one where one control system outputs one current command to two inverters, the inverter control device has two separate control systems that divide one current command and output each half to the respective inverter and one carrier circuit that modulates each control system at the same timing, or two separate converters are connected to the power element of the respective inverters.

2 Claims, 3 Drawing Sheets

INVERTER CONTROL DEVICE FOR DRIVING AN ELEVATOR

FIELD OF THE INVENTION

This invention relates to an inverter control device for an induction motor that drives an elevator and, more particularly, it relates to a high-capacity inverter control device.

BACKGROUND ART

Elevators are usually driven by induction motors and inverters are mainly used to control these motors.

FIG. 4 is a diagram showing an example of the vector control device of a known induction motor. In the figure, 41 is the induction motor and 42 is the speed detector. Speed computer section 43 is connected to speed detector 42 and speed wn is calculated from the determined values. This speed wn and speed command N are compared and input to torque computing section 44 in which (It), the torque current command is found by proportional integration and the primary current value I1 is found by primary current computing section 45 from this torque current (It) and exciting current Io. On the other hand, phase computing section 46 computes phase angle of torque current (It) and exciting current Io and slip frequency computer section 47 computes slip frequency ws from torque current It, exciting current Io and secondary time constant 72 of the motor. This slip frequency ws is added to speed detected value wn to obtain primary angular frequency wo. The primary current value I1, phase angle $\phi$, and angular frequency wo are input to three-phase current computing section 48 and primary currents Ia, Ib, and Ic of motor 41 are calculated. This current is used as the current command for inverter 49, which feeds the primary current to motor 41.

As was previously mentioned, induction motors for driving elevators are mainly controlled by inverters. However, there has recently been a tendency toward a gradual increase in capacity from the small-capacity devices initially employed typically by use of many parallel power transistors.

When compared to other main circuit semiconductors, power transistors usually have a high breakdown rate and their use is complex. Consequently, the use of many parallel power transistors markedly reduces reliability of the entire device.

On the other hand, where passengers could be locked inside elevator cars, absolutely no breakdown of power circuits during operation should be tolerated. Although human rescue operations can be performed when low-capacity elevators break down, this is almost impossible because of torque in high-capacity devices. However, it is very difficult to obtain a zero breakdown rate with the current level of technology. Moreover, rescue methods are difficult to implement.

Disclosure of Invention

Objects of the invention include providing an inverter control device for driving elevators having improved reliability of high-capacity devices with no increase in cost and with which temporary emergency operation may continue until problems recur.

According to the present invention, an inverter control device for controlling the induction motor that drives elevators has two induction motor coils that are electrically separate, special inverters connected to each coil, and a control device that controls these two inverters with the same current command. The preferred structure is one where one control system outputs one current command to two inverters, the inverter control device has two separate control system that divide one current command and output each half to the respective inverter and one carrier circuit that modulates each control system with the same timing, or two separate converters are connected to the power element of the respective inverters.

This invention provides technology with which the reliability of a high-capacity motor is improved with no increase in cost and with which emergency operation or continued operation or temporary operation until breakdown occurs again are simplified by using an inverter control device for an induction motor that drives an elevator which has two induction motor coils that are electrically separated, a special inverter connected to each coil, and a control system that controls these two inverters with the same current command. By dividing the power section of this inverter into two separate sections, one can continue operating, even if the other breaks down. Thus, reliability is improved. In the case of induction motors used to drive elevators, there is usually a torque margin of 150 to 200% of accelerating torque per 100% standard torque, and therefore, emergency operation is possible, even with only one-half the inverter output.

By means of this invention, there are two induction motor coils that are electrically separate, special inverters are separately connected to each coil, and there are controlled by the same current command. Therefore, two inverters are normally used, but when one breaks down, this inverter is cut off and only the other intact inverter is employed. As a result, temporary emergency operation may be continued until breakdown occurs again. This improves reliability of the device.

One current command can be sent from one control system to the two inverters as is, or it can be divided in half and these halves can be sent from two control systems to the two inverters. The inverter that breaks down is cut off by a relay, etc., that is in the back of the control system in the former case and in the front of the control system in the latter case. Moreover, when the current command is divided in half, PWM of these current commands must be performed with the same timing by wave source one carrier circuit.

Reliability of the two inverters can be improved even further by separating the converters, which are the power source. In such a case, the device can be operated during breakdowns by the method whereby operation is performed at one-half current and one-half torque or the method whereby the device is operated at one-half current and 100% torque, but at one-half speed.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
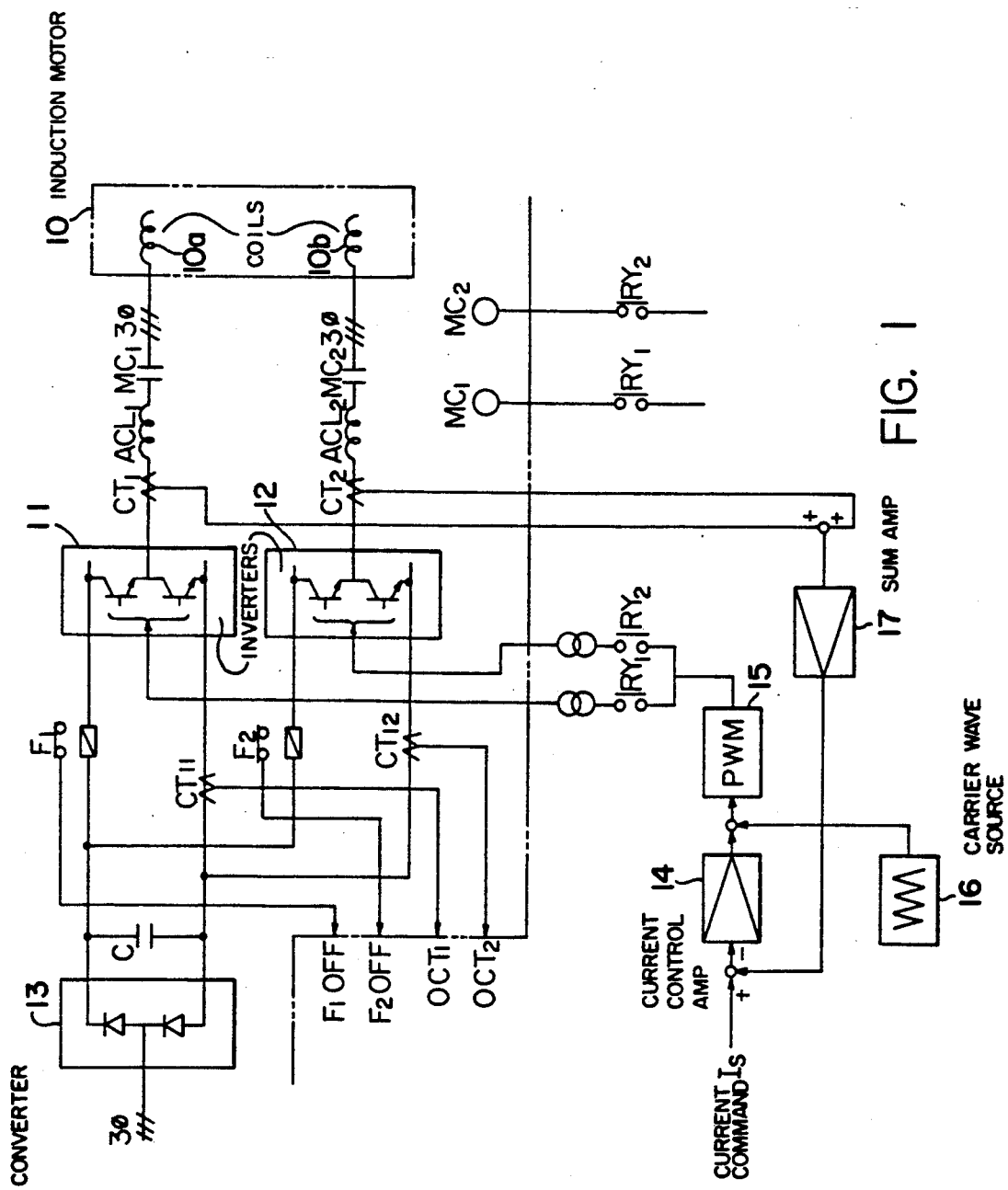
FIG. 1 is a diagram of one example of this invention.

This invention will now be explained in further detail with examples while referring to the drawing.

FIG. 1 is a diagram showing an example of the inverter control device of this invention. In FIG. 1, 10 is the induction motor, 10a and 10b are the coils, 11 and 12 are inverters, 13 is the converter, 14 is the current-control amp, 15 is the pulse width modulator, (PWM) 16 is the carrier circuit and 17 is the addition (SUM) amp.

The coils of induction motor 10 are two separate induction motor coils 10a and 10b. Inverters 11 and 12 are connected to each coil through induction coils ACL1 and ACL2.

One current control system consists of current control amp 14, pulse width modulator 15, and carrier wave source 16. It controls using one current command (Is). However, detection of the inverter output current is performed by separate detectors CT1 and CT2 which are summed in addition amp 17. Furthermore, the structure of pulse width modulator 17 and carrier wave source 16 of the current control system is not restricted to the examples. For instance, PWM control by a CPU, etc., can also be performed. The symbols "3φ" indicate that triple the shown apparatus would normally be used in a polyphase system, although the invention may be employed in single phase systems, if desired.

With regard to output of pulse width modulator 15, the two relays RY1 and RY2 are usually on, and therefore, the same PWM signals are input to the two inverters 11 and 12 to simultaneously control the inverters. Breakdown of either of the inverters 11, 12 is detected from the "cut" signal of fuse F1 or F2 or the detection signals (OCT1, OCT2) of detectors CT11 and CT12. Then relay RY1 or relay RY2 is turned off and only the other relay operates.

When only one inverter is used, one of the following two methods are employed. It is not necessary to use both methods.

(1) The current command is divided in half and the device operates at a degree of acceleration within a torque range of one-half the standard maximum current.

In this case, the device can be run up to the maximum speed.

(2) The current command is divided in half and the V/F ratio of the motor is approximately twice the conventional level. The device is operated so that the same degree of acceleration as normally used is obtained at one-half the current that is normally employed.

In this case, the device is only running at up to one-half the maximum speed.

By means of either of the two methods, it is possible to obtain an output at the same torque as in conventional methods at one-half the current and to continue operation until breakdown of the other inverter occurs by changing the V/F ratio of the motor, as long as the device is operating at one-half the speed.

Furthermore, although FIG. 1 is a simplified view of converter 13 and shows the diode system, in large-capacity devices, regeneration to the power course is common with the same type of control structure being used on the inverter side. The DBR system is used in this case. By means of this example, only one current control section is used. Therefore, the difference in on/off timing between the two inverters is only as large as the variations between individual circuit elements and a small ACL will provide sufficient balance. Moreover, it is not necessary to take into consideration timing differences and control of up to PWM by computation in a CPU can actually be performed. In addition, the adjustment factors and circuit itself are simple, and therefore, there is not necessarily an increase in cost when compared to inverter sections of large devices. where many transistors are connected in parallel and many inverters are used.

Figure 2:
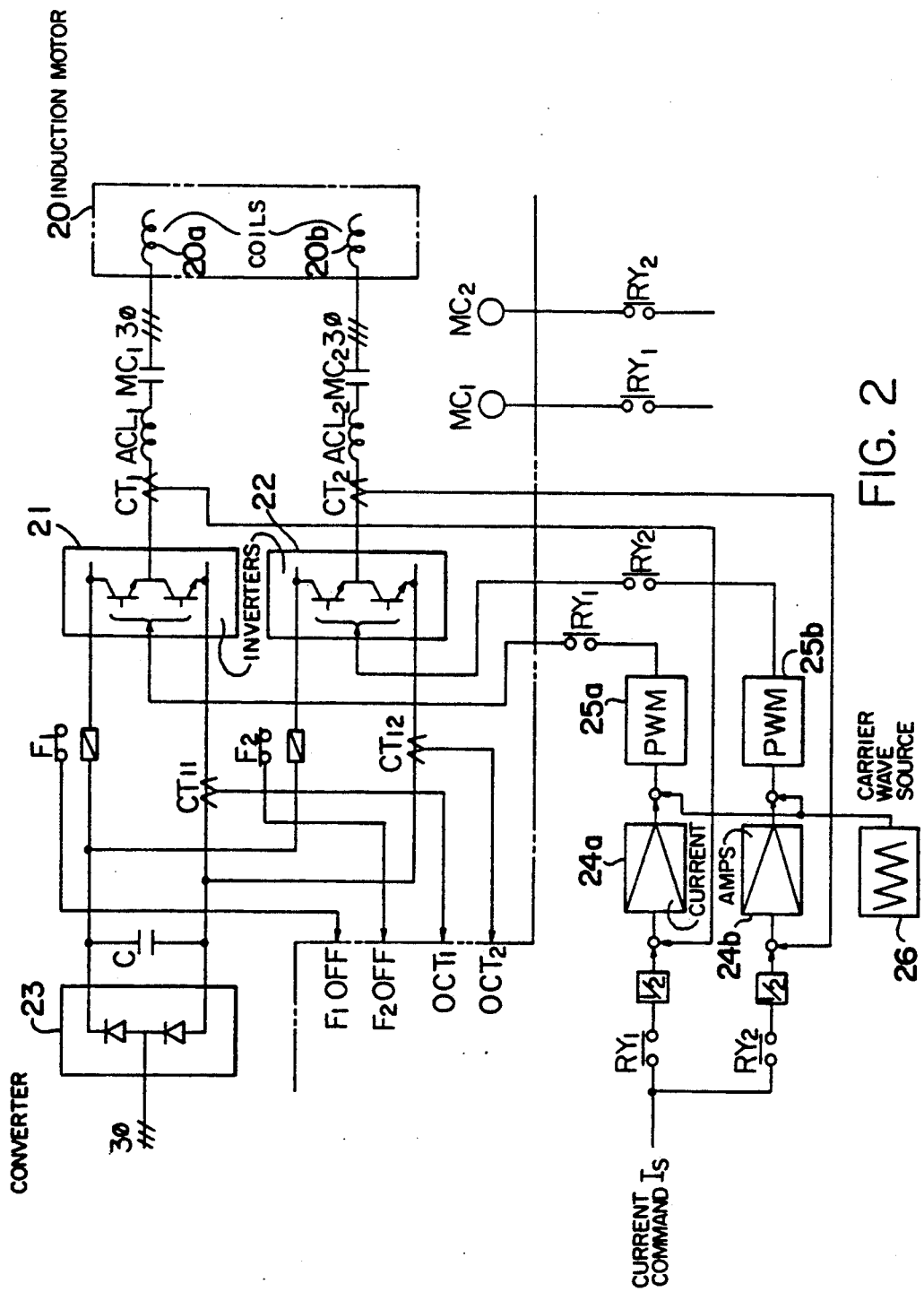
FIGS. 2 and 3 are diagrams of other examples of this invention.

FIG. 2 shows another example of the inverter control device of this invention. In the same figure, 20 is an induction motor, 20a and 20b are its coils, 21 and 22 are the inverters, 23 is a converter, 24a and 24b are current control amps, 25a and 25b is the pulse width modulator, and 26 is the carrier wave source.

As in the aforementioned example, the coil of induction motor 20 is actually two separate coils 20a and 20b. Inverters 21 and 22 are set up at each coil using induction coils ACL1 and ACL2.

With regard to current command Is, the command from the ASR section is divided in half and the output current of inverters 21 and 22 is controlled by two separate control systems of the current control system that operates by current control amp 24a and pulse width modulator 25a and the current control system that operates by current control amp 24b and pulse width modulator 25b. Inverters are simultaneously controlled by signals from one carrier wave source 26 so that on-off timing and polarity are balanced in sections of PWM conversion of output from current control amps 24a and 24b by pulse width modulators 25a and 25b.

Controls are usually implemented with both of the two relays RY1 and RY2 being on. Inverters 21 and 22 simultaneously control one motor 20 and one-half of the total current is carried by the induction motor. In this case, there is a difference in on/off timing between inverter 21 and inverter 22 due to a small error by current amps 24a and 24b and pulse width modulators 25a and 25b. Although back electromotive force of induction motor 20 is applied, this effect is absorbed by induction coils ACL1 and ACL2.

When there are anomalies with one of the inverter 21, 22 and this anomaly is detected by the "cut" signal of either fuse F1 and F2, or the detection signals from detectors CT11 and CT12 (OCT1, OCT2), etc., the inverter that has broken down is cut off by turning relay RY1 or RY2 off. Moreover, although current command Is is two-fold the standard current command, capacity of the one inverter that remains intact is not exceeded.

FIG. 2 is the diode system showing a simplified converter 23. In large devices, the converter side can be controlled similar to the inverter side and regeneration to the power source is commonly used. In this case, a DBR system is used.

By means of this example, the same effects and results as in Example 1 are obtained in that continuous operation until breakdown occurs once again is possible with no increase in cost, there is little difference in current distribution with differences in on/off timing of the two inverters because PWM timing is performed from one carrier, wave source and therefore, a small ACL provides sufficient balance, etc. Moreover, since two separate current control systems are used, the standard current distribution to the two inverters can be precisely controlled. In addition, the two inverters can be automatically shut off electrically. Thus, there are advantages in that the device can immediately be temporarily operated by one inverter when the other inverter breaks down.

Figure 3:
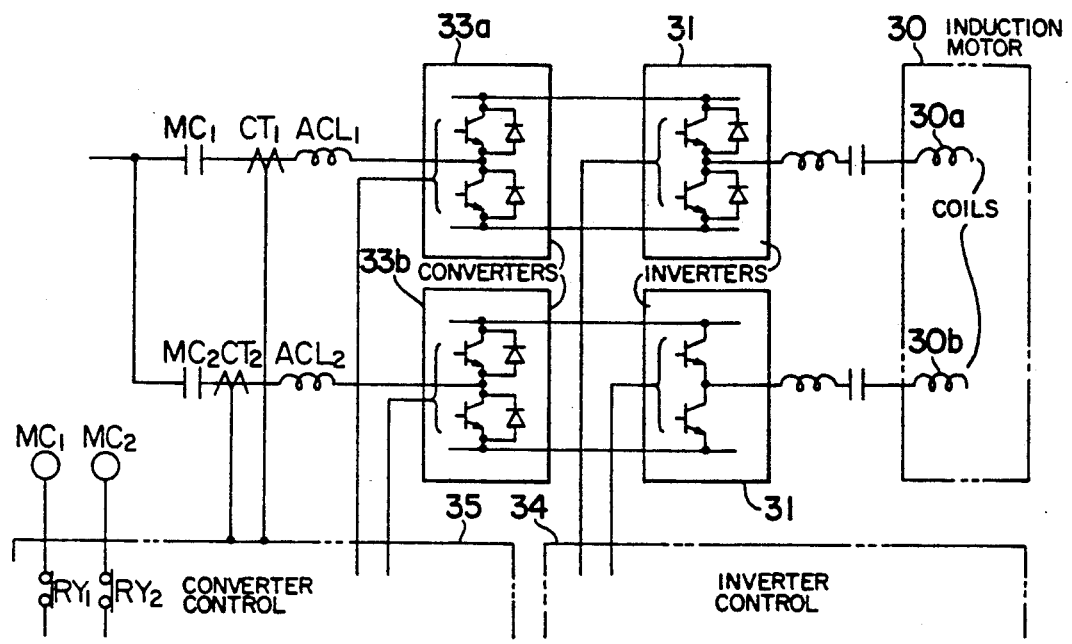
Figure 4:
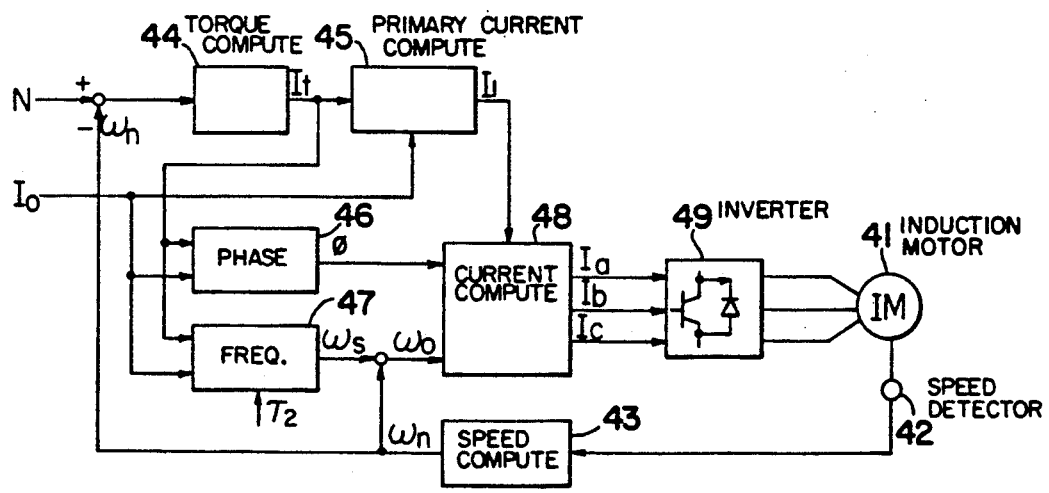
FIG. 4 is a diagram of an example of a known vector control device for the induction motor.

FIG. 3 is a diagram of another example of the inverter control device of this invention. The numeral 30 in the same figure is the induction motor, 30a and 30b are its coils, 31 and 32 are inverters, 33a and 33b are converters, 34 is the inverter control section, and 35 is the converter control section.

A function for regeneration to the power sources is usually installed on the converter side in order to improve energy efficiency of large-capacity elevator driving devices and the apparent circuit structure is often exactly the same as on the inverter side. Therefore, by means of this invention, two completely separate control systems are set up in the main circuit, not only on the inverter side but also on the converter side. Two separate converters 33a and 33b are connected to the power sources of inverters 31 and 32.

Under standard operating conditions, one current control section usually consists of inverter control section 34 and converter control section 35, and this controls a circuit comprised by converter 33a and inverter 31 and a circuit comprised of converter 33b and inverter 32. However, when breakdown occurs, the circuit on the breakdown side is cut off and the device is operated only by the intact circuit. This operation can be performed by the method where the device is operated at one-half current and one-half torque at full speed, or the method whereby the device is operated at one-half current and 100% torque, but at one-half speed.

By means of this example, it is possible to simply use the inverter and converter sections as two parallel structures with one-half the device capacity. Simplification is easy and an overall cost increase is avoided.

Furthermore, it goes without saying that although the figure shows a power transistor converter, a variety of methods, such as a diode system or thyristor system, can be employed.

As was previously explained, by means of this invention an inverter control device for driving an elevator provides improved reliability of large-capacity devices, with no increase in cost, and and which temporarily permits continued emergency operation operation until breakdown occurs again are possible.

Although the invention has been shown and described with respect to various embodiments thereof, it should be understood by those skilled in the art that the foregoing and various other changes, omissions, and additions in the form and detail thereof may be made therein without departing from the spirit and scope of the invention.

We claim:

1. An induction motor drive system for driving an elevator comprising:
   an induction motor having two electrically separate induction motor coils;
   a power source;
   control means responsive to a current command signal provided thereto indicative of desired elevator motion to provide control signals for controlling said induction motor;
   a pair of inverter means selectively connected to said control means, each connected between said power source and one of said coils, each for driving a corresponding one of said coils in response to aid control signals provided thereto by said control means; and
   switch means for normally connecting each of said inverter means to said control means and for selectively disconnecting either one of said inverter means from said control means in response to failure of such inverter means.

2. A system according to claim 1 wherein
   said induction motor is a polyphase motor having two separate polyphase coils and said switch means and each of said inverter means comprise means for each phase of each of said coils.

* * * * *